United States Patent [19]

Moreira

[11] Patent Number: 5,166,688

[45] Date of Patent: * Nov. 24, 1992

[54] METHOD FOR EXTRACTING MOTION ERRORS OF A PLATFORM CARRYING A COHERENT IMAGING RADAR SYSTEM FROM THE RAW RADAR DATA AND DEVICE FOR EXECUTING THE METHOD

[75] Inventor: Joao Moreira, Landsberg, Fed. Rep. of Germany

[73] Assignee: Deutsche Forschungsanstalt fur luft -und Raumfahrt e.V., Cologne, Fed. Rep. of Germany

[ * ] Notice: The portion of the term of this patent subsequent to Sep. 3, 2008 has been disclaimed.

[21] Appl. No.: 548,797

[22] Filed: Jul. 6, 1990

[30] Foreign Application Priority Data

Jul. 7, 1989 [DE] Fed. Rep. of Germany ....... 3922428

[51] Int. Cl.$^5$ .............................................. G01S 13/90
[52] U.S. Cl. ........................................ 342/25; 342/195
[58] Field of Search ................................... 342/25, 195

[56] References Cited

U.S. PATENT DOCUMENTS

| | | | |
|---|---|---|---|
| 4,034,370 | 7/1977 | Mims | 342/25 |
| 4,134,113 | 1/1979 | Powell | 342/25 |
| 4,170,006 | 10/1979 | Falk | 342/25 |
| 4,292,634 | 9/1981 | Wu et al. | 342/25 |
| 4,321,601 | 3/1982 | Richman | 342/25 |
| 4,359,732 | 11/1982 | Martin | 342/191 |
| 4,471,357 | 9/1984 | Wu et al. | 342/25 |
| 4,723,124 | 2/1988 | Boles | 342/25 |
| 4,771,287 | 9/1988 | Mims | 342/25 |
| 4,851,848 | 7/1989 | Webner | 342/25 |
| 4,978,960 | 12/1990 | Newcomb et al. | 342/25 |
| 5,045,855 | 9/1991 | Moreira | 342/25 |

FOREIGN PATENT DOCUMENTS 2185869 7/1987 United Kingdom .
8810434 12/1988 World Int. Prop. O. .

OTHER PUBLICATIONS

Merrill I. Skolnik, "Radar Applications", pp. 321-356.
Livingstone et al., "CCRS C/X-Airborne Synthetic Aperture Radar: An R and D Tool for the ERS-1 Time Frame", pp. 15-21.

Primary Examiner—John B. Sotomayor
Attorney, Agent, or Firm—Browdy and Neimark

[57] ABSTRACT

For the imaging of terrains with varied ground reflectivity, azimuth spectra continuously following each other in time are formed over a set period of time in a method for extracting motion errors of a platform carrying a coherent imaging radar system from raw radar data. By determining the position of the maximum of the correlation between two azimuth spectra formed immediately following each other in time, the frequency shift of the ground reflectivity part is obtained. Then a separation of a velocity $\dot{V}_v(t)$ in the forward direction from an acceleration $\dot{V}_b(t)$ in the direction of LOS of the antenna is performed by filtering and the acceleration $\dot{V}_b(t)$ obtained is subjected to normalization after two-fold integration, by means of which the displacement in LOS, i.e. the motion errors in the line of sight direction of the antenna, is obtained. In contrast to GPS systems, all information is taken from the raw radar data and no ground station is required, so that the present method can be used much more flexibly and is more self-sufficient. Furthermore, in comparison with the autofocus method, the present method has a much greater band width and can be performed in real time, which cannot be realized with the autofocus method.

2 Claims, 5 Drawing Sheets

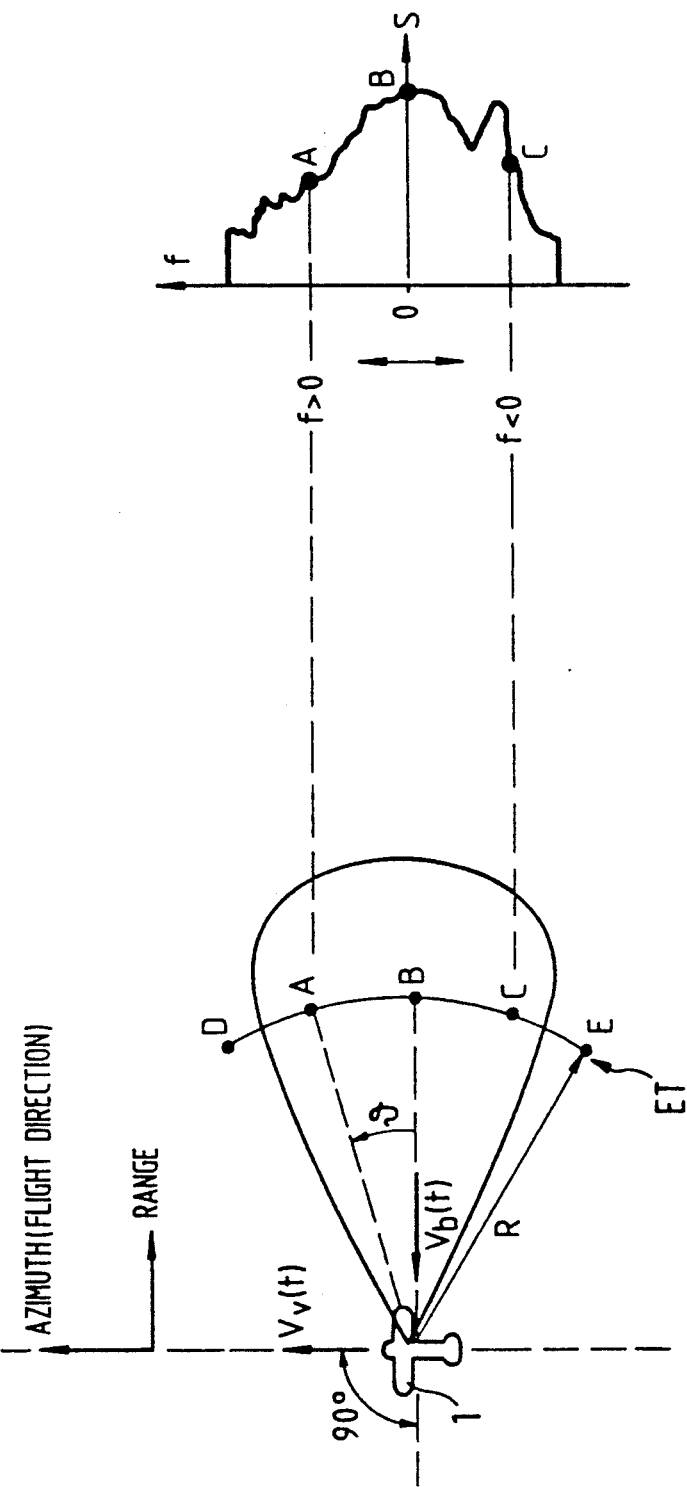

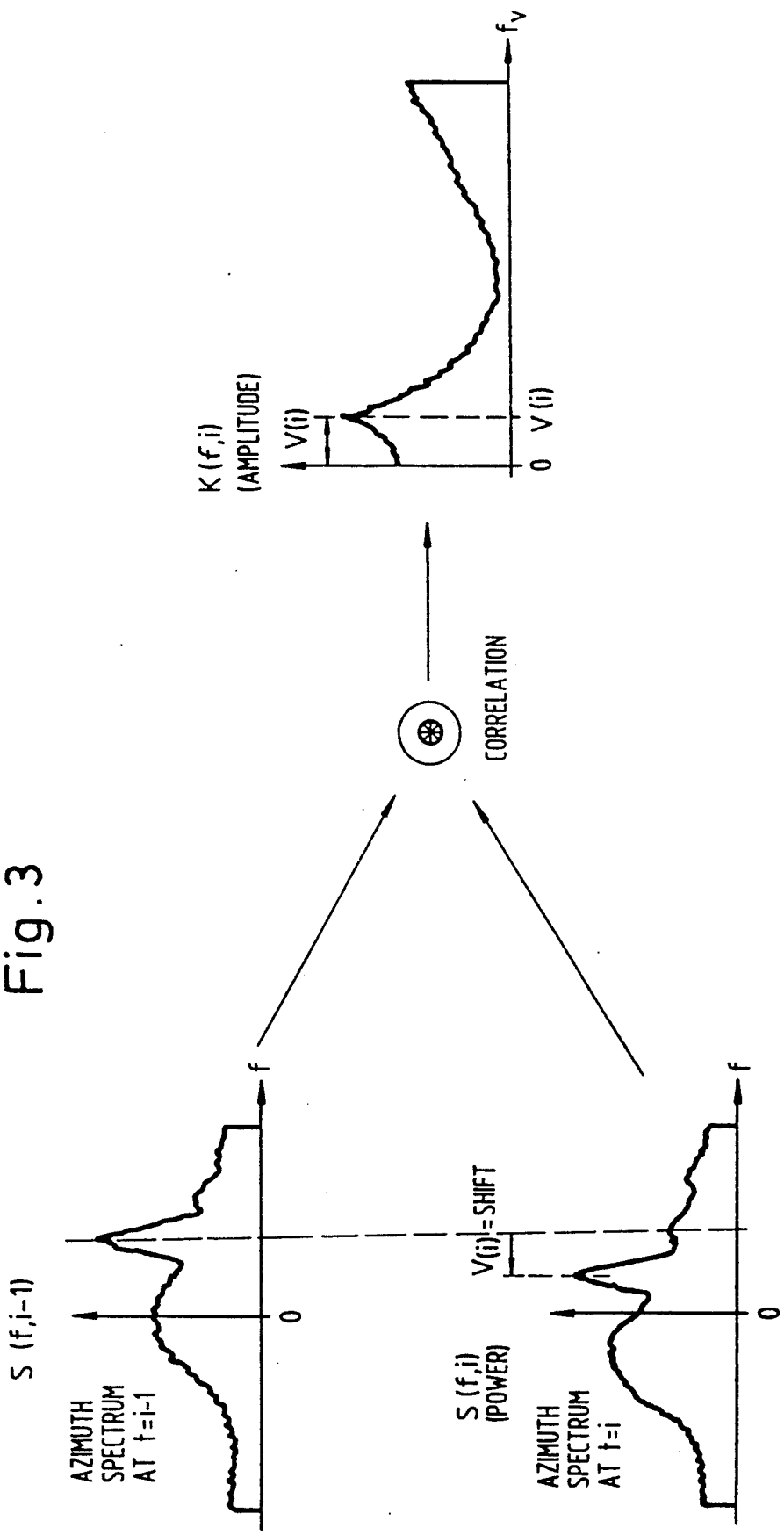

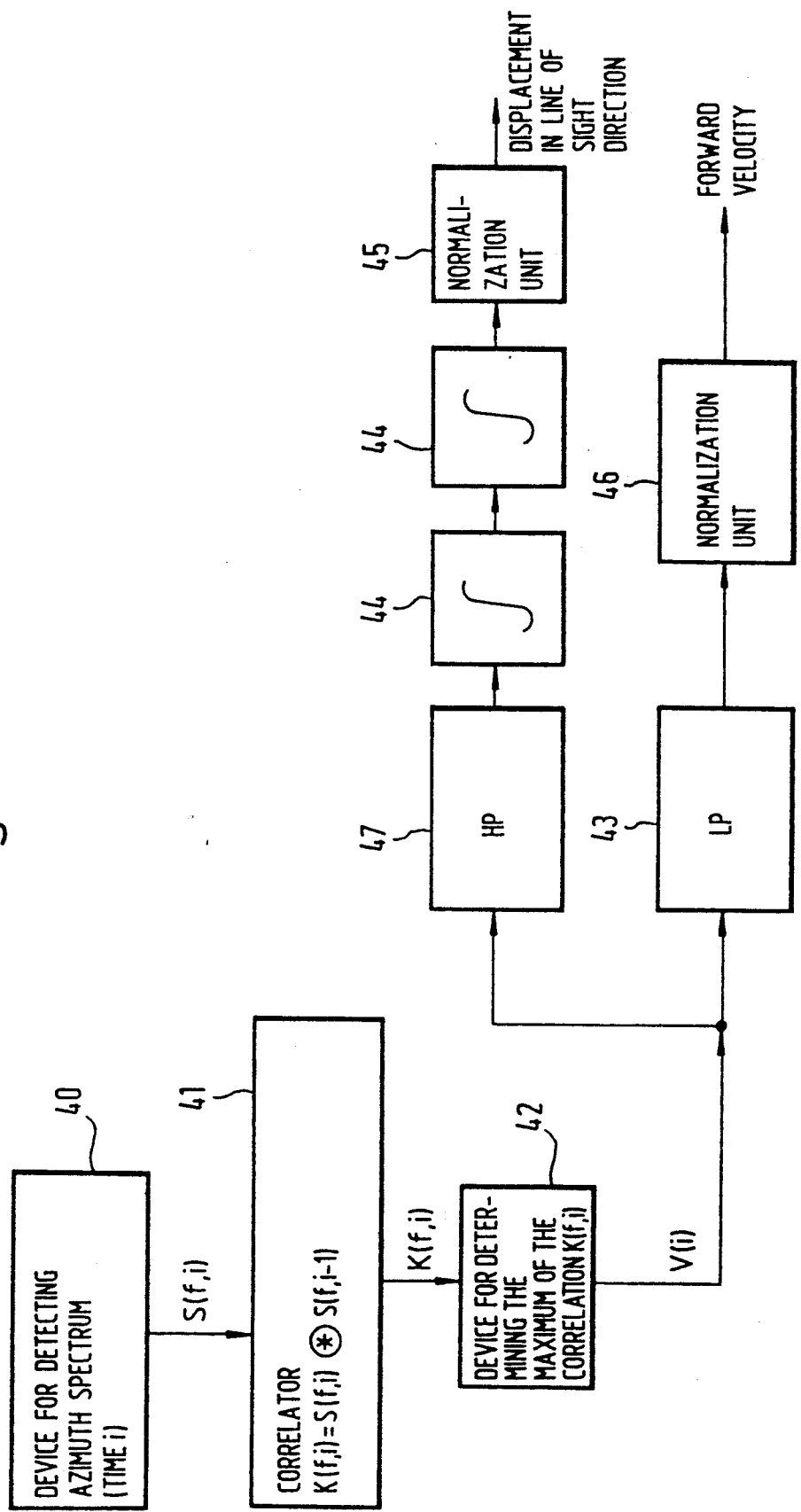

METHOD FOR EXTRACTING MOTION ERRORS OF A PLATFORM CARRYING A COHERENT IMAGING RADAR SYSTEM FROM THE RAW RADAR DATA AND DEVICE FOR EXECUTING THE METHOD

BACKGROUND OF THE INVENTION

1. Field of the Invention

The invention relates to a method for extracting motion errors of a platform carrying a coherent imaging radar system from the raw radar data and device for executing the method.

2. The Prior Art

Coherent imaging radar systems are installed on a platform, such as an aircraft, missile or helicopter or the like. Because of the conditions prevailing in connection with such platforms and because of the effects of their surroundings, such as turbulence, a platform normally cannot maintain a preset flight path. The platform deviates from the desired, set flight path, which is called a motion error. Motion errors of a magnitude of the wave length of the radar transmission signal cause distortions in coherent imaging radar systems, because of which the quality of an image is greatly reduced. The quality of an image is judged by its resolution, the contrast and the geometric distortions.

To attain high resolution, high contrast and low geometric distortions in an image, the raw data received must be corrected prior to processing or generation of the image. Such corrections can be performed in real time or off-line. Real time corrections are performed during reception of backscatter signals with the aid of digital or analog devices. After the raw data have been stored, off-line corrections are made on the ground with the aid of computer programs.

Processing or generation of an image can only be performed after a correction, which is called motion compensation. A correlation between the raw data and the expected theoretical phase history is performed for generating an image, and a high resolution two-dimensional image can only be obtained after such a correlation.

All real time motion compensation systems depend on onboard inertial navigation systems (INS) or other navigation systems, such as GPS (Global Positioning System). With some real time motion compensation systems, an additional simple Doppler analysis of the raw radar data is performed in order to estimate the angle of drift of the platform based on wind effects or because of the scanning geometry. This has been described by way of example in a publication in connection with a CCRS symposium, held in Canada in 1988, in the form of a special issue 88 CH 2572-6/88/0000-015 of IEEE.

Either a processing program similar to that used with the real time systems is used with all known off-line motion compensation systems and/or an autofocus method is additionally used during generation of the image.

However, all known motion compensation systems have several disadvantages. Because of the high demands made on the motion data in respect to accuracy, band width and temporal stability, it is necessary to use inertial navigation systems which, for example, have been specially manufactured, in connection with imaging radar systems where motion compensation is performed. However, this results in very high costs for procurement, installation and maintenance. When using motion compensation systems operating with GPS receivers, support by a ground station is absolutely necessary. However, because of this not only are the operating costs very high, but considerable restrictions in the choice of the field of operations must also be expected. But without the support of a ground station, the GPS motion data absolutely required for motion compensation are not sufficiently exact.

Although autofocus methods are not dependent on inertial navigation systems, these methods cannot be performed in real time because of the great computing demands. Furthermore, autofocus methods do not have a great band width, nor do they have high accuracy, so that motion errors caused in particular by wind gusts cannot be corrected. For this reason, autofocus methods are normally only used to estimate the forward motion of a platform.

BRIEF DESCRIPTION OF THE INVENTION

It is therefore the object of the invention to improve the picture quality of the images by means of a method for the extraction of motion errors of a platform carrying a coherent imaging radar system from the raw radar data as well as by means of a device for executing this method without having to resort to a navigation system, such as INS.

A prerequisite for this is that the motion data regarding a platform carrying the imaging radar system are determined very exactly so that the raw data thus obtained can be appropriately corrected. For this, the following movements of the platform must be determined, namely its forward velocity, the displacement of LOS, i.e. the displacement in Line Of Sight direction of the antenna, as well as the drift angle of the platform. In accordance with the invention, separation and evaluation of two parts of an azimuth spectrum will be performed for extracting motion errors, namely either the separation and evaluation of what will be called hereinafter an antenna pattern part or of what will be called hereinafter a ground reflectivity part. In what follows, only the evaluation of the ground reflectivity part will be described and treated this method will therefore be called the reflectivity displacement method for simplicity's sake. In this connection the ground reflectivity is understood to be the ratio between the output of the received and the transmitted signal.

In contrast to the GPS systems previously mentioned, it is particularly advantageous in the motion extraction method according to the invention that all information required for motion compensation is taken from the raw radar data. In contrast to the GPS systems, there is no need for a ground station, so that the method of the invention can be used much more flexibly and is more self-sufficient.

In comparison with the autofocus method, the motion extraction method of the invention has a much higher band width. It is furthermore possible to determine in addition many motion errors, such as acceleration, velocity and displacement, i.e. the motion errors (displacement) in LOS direction of the antenna. All these are data which cannot be obtained by means of the autofocus method. The execution of the method of the invention is also possible in real time, which can also not be realized with the autofocus method. The invention will be described by means of a preferred embodiment, making reference to the attached drawings.

BRIEF DESCRIPTION OF THE DRAWINGS

FIG. 1a is a general schematic view of the flight geometry of a radar;

FIG. 1b is the azimuth spectrum of a range gate in the form of a diagram;

FIG. 2a is a schematic view of the azimuth spectrum of a range gate, FIG. 2b is a schematic course of a spectrum of antenna diagram, and FIG. 2c is a schematic course of the spectrum of the ground reflectivity;

FIG. 3 is a schematic course of an azimuth spectrum at two different points in time (t=i−1 and t=i) as well as their correlation in the method of the invention;

FIG. 4 is a block diagram of a device for executing the method, and

DETAILED DESCRIPTION OF THE PREFERRED EMBODIMENT

Figure 2C:
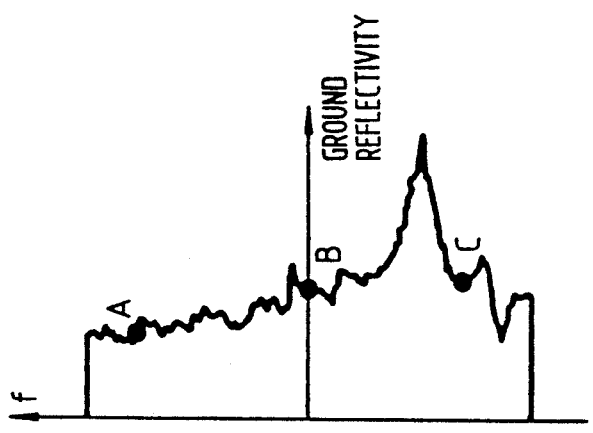
FIGS. 2a to 2c are schematic views of diagrams which, in their totality, form an azimuth spectrum, where

In the method of the invention for the extraction of motion errors, the azimuth spectrum of the raw radar data is principally evaluated and following that in particular the part derived from the ground reflectivity, hereinafter this method is called the reflectivity displacement method, as already mentioned.

Shown in FIG. 1a is an example of a common flight geometry of a radar and of the corresponding azimuth spectrum. The platform for a radar system in the form of a schematically indicated aircraft 1 flies at a forward velocity $V_v$ and in this way has a velocity error $V_b$ in the LOS- direction of an antenna, not shown in detail, the main lobe of which is schematically shown, where its beam angle in the present case has an approximate value of about 17°. The two velocity vectors $V_v$ and $V_b$ are dependent on the time t and are therefore indicated as $V_v(t)$ and $V_b(t)$ in the drawing and hereinbelow. A terrain to be represented is illuminated by the main lobe of a radar antenna disposed on the aircraft 1, which is directed crosswise to the direction of flight. For example, point targets A, B, C, D and E have been preset in a certain range gate Et as targets to be acquired. In FIG. 1 only the point targets A, B and C are illuminated.

Due to the forward velocity $V_v(t)$ and the velocity in the LOS- direction $V_b(t)$, each backscatter signal suffers a frequency or Doppler shift in accordance with the following equation (1):

$$F_{doppler} = \frac{2 \cdot V_v(t) \cdot \sin\nu}{\lambda} + \frac{2 \cdot V_b(t) \cdot \cos\nu}{\lambda} \quad (1)$$

where $\nu$ is the angle between the radar line of sight to the respective point target and the line perpendicularly to the aircraft path (which, in the example shown, extends through the target point B), and $\lambda$ is the wave length of the radar pulse transmitted.

A positive frequency shift is generated for the point target A with an angle $\nu > 0$ and the forward velocity $V_v(t)$, while for the point target C a negative frequency shift is generated with an angle $\nu < 0$ and a forward velocity of $V_v(t)$. No frequency shift is generated for the point target B due to the velocity $V_v(t)$.

An azimuth spectrum of the range gate Et is schematically shown in FIG. 1b, the frequency f being entered on the vertical axis and the power S in respect to the three point targets A, B and C on the horizontal axis. Furthermore, it has been indicated to the left of the vertical axis that the frequency f is greater than 0 in the positive direction and less than 0 in the negative direction.

Figure 2B:
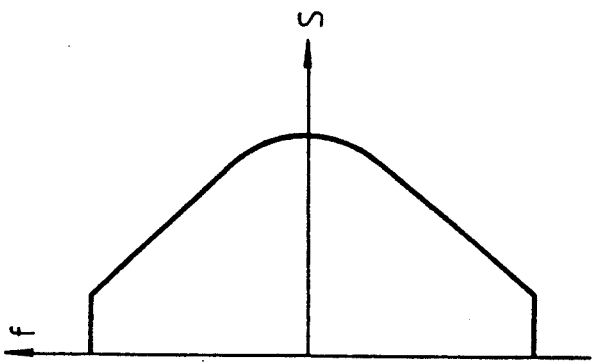
Figure 2A:
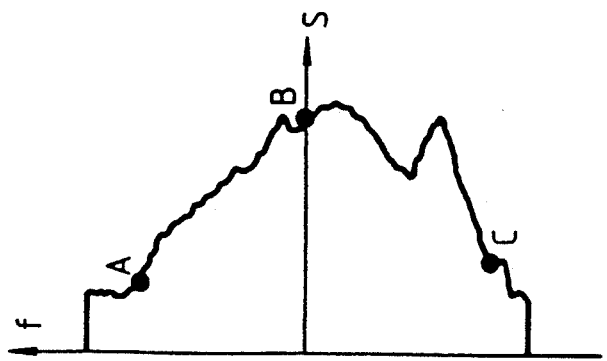

In FIGS. 2a to 2c the composition of an azimuth spectrum is given in the schematic course of graphs, the frequency f being entered in the individual drawings on the vertical axis and the power S on the horizontal axis. As can be seen from FIGS. 2b and 2c in particular, the azimuth spectrum of a range gate Et shown schematically in FIG. 2a is essentially composed of the product of the antenna pattern in the azimuth direction shown in FIG. 2b and of the round reflectivity given by the respective target points A, B and C, for example, and shown in FIG. 2c. By ground reflectivity is meant the ratio of the power of a received and a transmitted signal.

The antenna pattern part of an azimuth spectrum shown in FIG. 2b is shifted in frequency by a drift angle and the velocity in the LOS- direction of the antenna in accordance with equation (2) below, where the results for a frequency shift $f_a$ are:

$$f_a \approx \frac{2 \cdot V_v(t) \cdot \sin\phi(t)}{\lambda} + \frac{2 \cdot V_b(t)}{\lambda} \quad (2)$$

$\phi$ (t) being the drift angle of the platform.

The part of the ground reflectivity of the azimuth spectrum is only shifted by the velocity in the line of sight direction of the antenna in accordance with equation (3) below. The result for this frequency shift $f_r$ is:

$$f_r \approx \frac{2 \cdot V_b(t)}{\lambda} \quad (3)$$

The basic idea of the method for the extraction of the motion errors of a platform carrying a coherent imaging radar system lies in that the two parts of an azimuth spectrum shown in FIGS. 2b and 2c, namely the antenna pattern part and the ground reflectivity part, are separated from each other and separately evaluated.

The accuracy of the method depends in this case on the course of the ground reflectivity or on the contrast $\tau$ of the azimuth spectrum. The contrast $\tau$ of an azimuth spectrum is defined as follows:

$$\tau = \frac{\text{Standard deviation of the power of the azimuth spectrum}}{\text{Mean value of the power of the azimuth spectrum}} \quad (4)$$

If a terrain to be represented has a constant reflectivity, the contrast $\tau$ of the azimuth spectrum is small, i.e. standard deviation almost equals 0, so that in this case the course of the spectrum or the shift of the ground reflectivity part cannot be exactly determined. If, however, a terrain to be represented has varied reflectivity, i.e. shows a standard deviation considerably greater than 0, the contrast $\tau$ is also high and the determination of the spectrum shift is exact.

Terrains such as the sea, the desert and the like in general have a very low and constant reflectivity while terrains such as dry land with cities, meadows, mountains etc. do not have a homogenous reflectivity and thus a high contrast in the azimuth spectrum.

Therefore, in accordance with the present invention, the so-called reflectivity displacement method is used in terrains which do not have a homogenous ground reflectivity and thus high contrast, while in terrains with lesser contrast $\tau$ a method can be used, which uses the antenna pattern part, the accuracy of which is maintained independently of the contrast $\tau$ and which is the subject of a patent application P 39 22 427.9, filed on Jul. 7, 1989, in the German Patent Office and called spectrum centroid method.

In the reflectivity displacement method in accordance with the invention the shift between two azimuth spectra following each other in time is evaluated. Two such azimuth spectra are illustrated in FIG. 3, in the top part for the time $t=i-1$ and in the bottom part for the time $t=i$, where i is a whole number larger than 1. In the two azimuth spectra, this time the power S as a function of the frequency f on the horizontal axis is placed on the vertical axes. Furthermore, a shift V(i) of a maximum in relation to the azimuth spectrum in the top part of FIG. 3 is drawn in the bottom diagram.

As already described above, when using this method the terrain to be represented must have variable ground reflectivity, so that the graphs representing the ground reflectivities do not show a constant course, such as is the case in the two azimuth spectra in FIG. 3. In this case the course of a ground reflectivity always shows a negative frequency shift, because a platform 1 carrying the radar system always flies in a forward direction and therefore all scatter sources, i.e. all objects illuminated by the radar and scattering back, have a negative course of the Doppler shift.

Thus, two successively taken spectra are very similar and, after appropriate development, a frequency shift derived from equations (1) and (3) with a frequency shift V (in Hz) is obtained:

$$V = \frac{2 \cdot V_v^2(t) \cdot \Delta t}{\lambda \cdot R} + \frac{2 \cdot V_b(t) \cdot \Delta t}{\lambda} \quad (5)$$

where R is the range of the range gate from the antenna disposed on the platform 1 and $\Delta t$ the time difference between the spectra taken successively in time. As illustrated in the lower part of FIG. 3, the shift can be determined by the position of the maximum with the aid of a correlation of the two spectra, as schematically indicated in the right part of FIG. 3, and where, related to the example shown, the course of the graphs shown in the right part of the Figure results. In this case the amplitude as a function of the shift $f_v$ and the value i entered on the horizontal axis is shown on the vertical axis.

A block diagram of a device for the execution of the method for extraction of motion errors of a platform carrying an imaging radar system, which takes into account the ground reflectivity part is shown in detail in FIG. 4. To represent a terrain with varied ground reflectivity this terrain is illuminated by means of the main lobe of an antenna disposed on the aircraft 1. By means of this, azimuth spectra are continuously detected over a set period of time with a device 40 for detecting azimuth spectra in a timed sequence, i.e. at different points in time i (i being a whole number value greater than 1), where this time period for taking these data is much shorter than the time required by the aircraft to fly over the terrain to be represented. Two such azimuth spectra are schematically shown as examples for the time periods $t=i-1$ and $t=i$ in the left portion of FIG. 3. The azimuth spectra with an power S(f,i), taken in a timed sequence as a function of the radar azimuth frequency f, are passed to a device 41, for the formation of the correlation between two azimuth spectra taken immediately following each other in time, namely K (f,i) = S (f,i)✶S (f,i−1). In the device 42 downstream for determining the maximum of a correlation K (f,i), the frequency shift V(i) of the ground reflectivity part is determined by means of the position of a maximum, which can been seen schematically in the right part of FIG. 3 and which corresponds to the equation (5) shown above. The separation of the forward velocity $V_v(t)$ contained in the first term of equation (5), from the acceleration $\dot{V}_b(t)$ in the line of sight direction of the range gate Et contained in the second term of equation (5), is performed by means of a high-pass filter 47 and a low-pass filter 43 respectively. This is possible because the forward velocity $V_v$ has a very low band width at wind gusts up to 1 m/s, which extends from 0 to 0.1 Hz, for example. In contrast thereto, the acceleration $\dot{V}_b$ in the LOS- direction of the antenna has a considerably greater band width and furthermore, only the upper frequency portions are important for motion compensation and only frequency portions starting at 0.2 Hz need to be considered, for example.

So that it is possible to determine the displacement in the LOS- direction of the antenna, the data passed by the high-pass filter 47 are subjected twice to an integration in integrating units 44 and subsequently normalized in a normalization unit 45, while the frequency portions passed by the low-pass filter 43 for determining the forward velocity only need to be normalized in a normalization unit 46. At the output of the normalization unit 45 the displacement, i.e. the motion error in the line of sight direction of the antenna, is obtained as motion data, while at the output of the normalization unit 46 the forward velocity is obtained as motion data.

The method in accordance with the invention, repeatedly also called the reflectivity displacement method above, for example has the advantage over the previously cited inertial navigation system used in many cases, that the instant motion extraction method can be basically realized at considerably lower cost, and that the required computations can be performed particularly easy and quick in real time, as well as off-line, with the presently available computing systems and devices.

As already mentioned above, the method of the invention, here called the reflectivity displacement method, can only be successfully used if the terrain to be imaged does not have a homogenous reflectivity i.e. a comparatively high contrast $\tau$, such as is the case with the imaging of terrain on dry land, i.e. imaging of the countryside, cities, meadows, mountains or the like. Imaging terrain with a mainly homogenous reflectivity, i.e. with low contrast $\tau$, which for example is the case with imaging of the ocean, a desert, and the like. only inaccurate results could be obtained with the reflectivity displacement method described above.

In case of low contrast $\tau$, the antenna pattern part of an azimuth spectrum shown schematically in FIG. 2b must be evaluated. For this purpose, the respective round reflectivity portion is removed from the azimuth spectrum which is shown by way of example in FIG. 2c. The similarity of azimuth spectra taken sequentially is used for estimating the ground reflectivity If it is possible to estimate the ground reflectivity well, the antenna pattern part can be determined by dividing each azimuth spectrum received by the estimated ground reflectivity. In this case the accuracy of the estimate becomes higher with more even ground reflectivity courses, i.e. with low contrast $\tau$, because it then is possible to determine the antenna pattern part ever more clearly.

Here, the doppler centroid of the respective antenna pattern part corresponds to the frequency shift $f_a$ given in equation (2). Then the separation of the drift angle $\phi(t)$, contained in the first term of the equation (2), from the velocity $V_b(t)$ in the line of sight direction of the range gate Et is performed, the velocity $V_b(t)$ being contained in the second term of the equation (2). Such separation by means of frequency filtering is possible, because the drift angle caused by the wind has a very low band width of 0 to 0.1 Hz, for example, while the velocity $V_b$ in the LOS- direction of the antenna has a considerably greater band width, where again only the higher frequency portions are important for the motion compensation, i.e. frequency portions starting with 0.2 Hz. The displacement in LOS, i.e. the motion errors in the LOS direction of the antenna is also obtained here by means of a simple integration of the velocity in the LOS- direction of the antenna ($V_b$).

A specific use of the two above mentioned methods is obtained in an optimal manner, if the contrast of an azimuth spectrum is continuously evaluated and more weight is given to the method which provides the more accurate values in each case, during determination of the displacement in LOS, i.e. motion errors in the line of sight direction.

Figure 5:
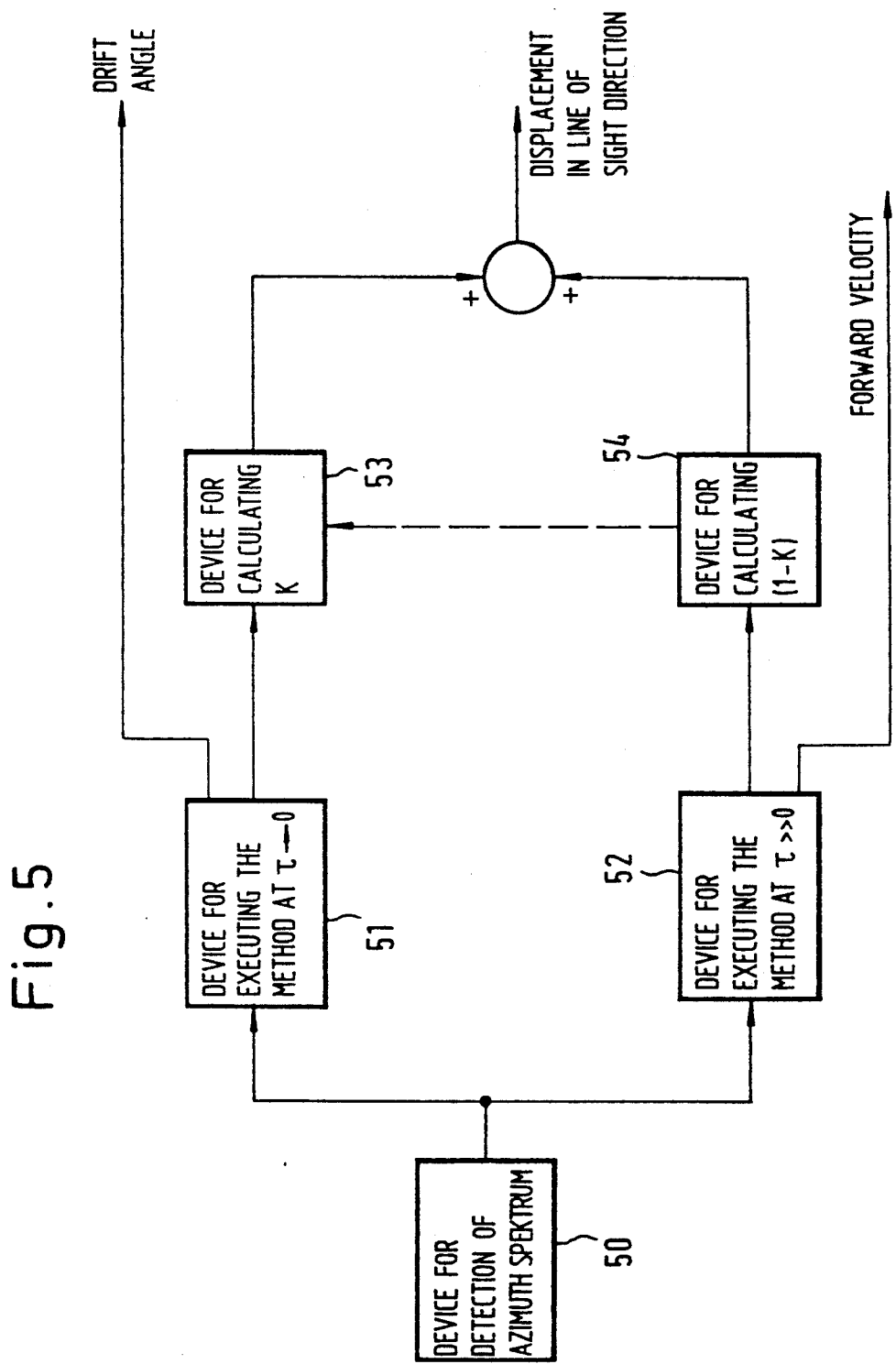
FIG. 5 is a schematic view of the linking of the method of the invention and a method for the determination of a ground reflectivity part for evaluating the practical motion extraction in relation to contrast conditions on the ground.

A block diagram for the linking of both methods is shown in FIG. 5. For a terrain with a homogenous reflectivity, such as the sea or the desert, the azimuth spectrum will have a low contrast $\tau$ as already described in detail above, so that the most accurate results will be obtained with the method last described. In contrast, for a terrain, such as the countryside, woods and/or cities, with varied ground reflectivity, the azimuth spectrum of which will show a high contrast $\tau$, so that the reflectivity displacement method of the invention provides the most accurate results.

In FIG. 5, the weight of the two methods is determined by a factor k. In this case the factor k will have values between 0 and 1 in accordance with the momentary contrast $\tau$ of the azimuth spectrum. In practice this means that with low contrasts $\tau$, i.e. $\tau \to 0$, the factor k approaches 1 (i.e. k−1), while for large contrasts $\tau$, i.e. $\tau > > 0$, the factor k approaches 0, i.e. k>0.

For the formation of the displacement in LOS, i.e. the motion errors in the line of sight direction of the antenna, in the block diagram of FIG. 5 a device 51 for executing the method at low contrast $\tau$ ($\tau \to 0$) and a device 53 for the formation of the factor k are placed downstream of a device 50 for detecting azimuth spectra, while a device 54 for forming the difference (1−k) is placed downstream of a device 52 for executing the reflectivity displacement method (at a contrast $\tau > > 0$), or of the normalization unit 45, as shown in detail in FIG. 4.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for the extraction of motion errors of a platform carrying a coherent imaging radar system from raw radar data, imaging terrains with varied ground reflectivity, forming azimuth spectra continuously successive in time over a set period of time, comprising the steps of:

obtaining the frequency shift of the ground reflectivity part by determining the position of the maximum of the correlation of two azimuth spectra formed immediately following each other in time;

performing a separation of a velocity ($V_v(t)$) in the forward direction from an acceleration ($V_b(t)$) in the LOS- direction of an antenna;

obtaining two terms ($2 \cdot V_v^2(t) \cdot \Delta t / \lambda \cdot R$ and $2 \cdot V_b(t) \cdot \Delta t / \lambda$) from the frequency shift of the ground reflectivity wherein $\Delta t$ is the time difference between the spectra taken successively in time, $\lambda$ is the wavelength of a transmitted radar pulse and R is the range of a range gate from the antenna;

multiplying the first term ($2 \cdot V_v^2(t) \cdot \Delta t / \lambda \cdot R$) with a constant ($\lambda \cdot R / 2 \cdot \Delta t$) and taking the square root of the product in order to obtain the velocity in the forward direction ($V_v(t)$);

subjecting the obtained second term ($2V_b(t) \cdot \Delta t / \lambda$) to a two-fold integration; and obtaining after the multiplication with a constant ($\lambda / 2 \cdot \Delta t$) the displacement in the line of sight direction (LOS) of the antenna.

2. A device for executing the method in accordance with claim 1, comprising:

an azimuth spectrum detection device (40), for the formation of azimuth spectra continuously following each other in time;

a means (41) for forming the correlation between two azimuth spectra formed immediately following each other in time; a means (42) for determining the maximum of the correlation; by a high-pass filter (47) for determining the displacement in the line of sight direction of the antenna, downstream of which two integrating units (44) and a normalization unit (45); and by a low-pass filter (43) and a further normalization unit (46) for the determination of the forward velocity placed down stream of said low pass filter.

* * * * *